(12) United States Patent
Loomis et al.

(10) Patent No.: US 6,912,924 B2
(45) Date of Patent: Jul. 5, 2005

(54) TESTING APPARATUS AND METHOD

(75) Inventors: Charles Loomis, Houston, TX (US);
Lisa K. Gilmour-Stallsworth, Houston, TX (US)

(73) Assignee: Nextteq, LLC, Tampa, FL (US)

( * ) Notice: Subject to any disclaimer, the term of this patent is extended or adjusted under 35 U.S.C. 154(b) by 0 days.

(21) Appl. No.: 09/826,575

(22) Filed: Apr. 5, 2001

(65) Prior Publication Data

US 2002/0040591 A1 Apr. 11, 2002

Related U.S. Application Data

(60) Provisional application No. 60/238,939, filed on Oct. 10, 2000.

(51) Int. Cl.$^7$ .................. G01N 19/00; G01N 31/00; G01M 3/04; B65D 37/00; B05B 7/00
(52) U.S. Cl. .............. 73/865.9; 73/40.7; 436/3; 422/61; 222/209; 222/630
(58) Field of Search ................ 73/1.03, 40.7, 73/865.9; 436/2, 3; 422/55, 61, 236; 222/209, 633

(56) References Cited

U.S. PATENT DOCUMENTS

| | | | | |
|---|---|---|---|---|
| 3,834,241 A | * | 9/1974 | Garren et al. ............ | 73/864.11 |
| 3,840,009 A | * | 10/1974 | Michaels et al. ......... | 604/892.1 |
| 3,938,392 A | * | 2/1976 | Rodrigues ................ | 422/922 |
| 4,012,203 A | * | 3/1977 | Rosiere ................... | 422/236 |
| 4,212,204 A | * | 7/1980 | St. Amand ............... | 73/864.11 |
| 4,272,479 A | * | 6/1981 | Huneke et al. ........... | 422/101 |
| 4,589,835 A | * | 5/1986 | St.Amand ................ | 156/198 |
| 5,073,347 A | * | 12/1991 | Garren et al. ............ | 422/100 |
| 5,173,266 A | * | 12/1992 | Kenney ................... | 422/100 |
| 5,302,344 A | * | 4/1994 | Perlman .................. | 422/26 |
| 6,098,802 A | * | 8/2000 | Asa et al. ................. | 206/443 |

FOREIGN PATENT DOCUMENTS

| | | | | |
|---|---|---|---|---|
| JP | 63131041 A | * | 6/1988 | .............. 73/40.7 |

OTHER PUBLICATIONS

Derwent abstract and Figure for RU 2110789 C1.*
Marketing Information from Sensidyne, Inc. on Air Flow Indicator Kit and Smoke Tubes for Testing Glove Bags available at least by Jan. 1995.
Press Release from Sensidyne, Inc. available at least by 1995, describing irritant smoke tubes.
Correspondence from Gastec Corp. to L. Stallsworth, dated Jul. 21, 2000 re smoke tester tube reagent, stannic choride and Gastec smoke tester set.
Correspondence from Drager re MSDS of Drager's Air Flow Tester, available at least by Feb. 17, 1999.
International Chemical Safety Card for Stannic Chloride available at least Jun. 1999.
OSHA Irritant Smoke (Stannic Chloride) protocol for Respirator fit testing, dated Feb. 1, 1999.
"Don't Use Qualitative Fit Testing for Full–Face Respirators," Health and Safety Application Note ITI–032, revised Mar. 19, 1998, http://www.tsi.com/his/homepage/applnote/iti$_{13}$ 032.htm, visited on Jul. 10, 2000.
"Air Flow Indicator," Kitigawa Gas Detector Tube System Handbook, Matheson Gas Products, Apr. 1995.

* cited by examiner

Primary Examiner—Michael Cygan
(74) Attorney, Agent, or Firm—The Morris Law Firm, P.C.; Alberto Q. Amatong, Jr.

(57) ABSTRACT

An apparatus is provided for testing equipment located in a local environment by presenting a detectable indicator gas therein. The apparatus has a container portion, a chemical substance stored in the container portion, a pump operable to draw air into the container portion and in contact with the chemical substance to generate a detectable indicator gas, and an outlet to the container for directing the indicator gas into the local environment. Further, the pump is integrally formed as one piece with the container portion. Preferably, the pump is a manually squeezable polymeric bulb that is joined (e.g., by molding) seamlessly with the container portion.

42 Claims, 3 Drawing Sheets

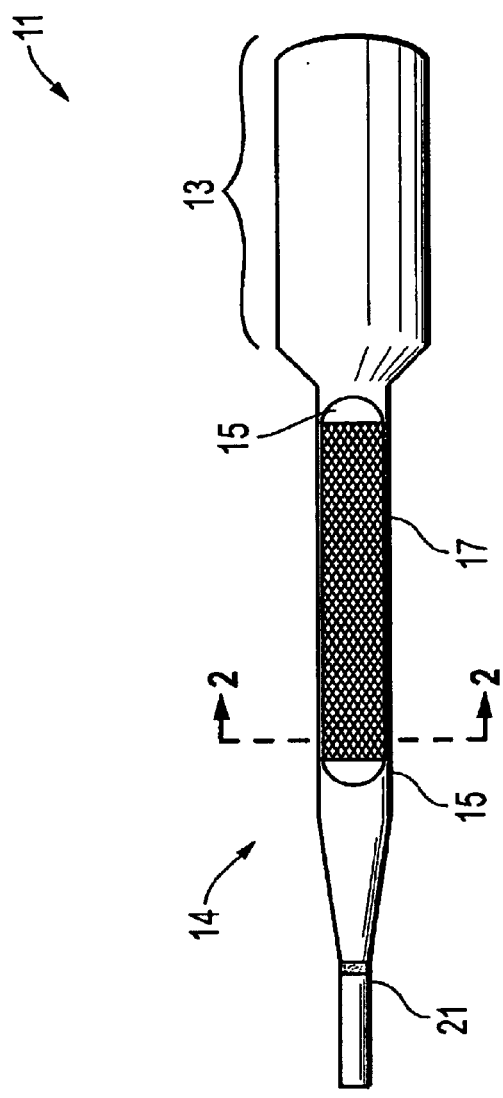
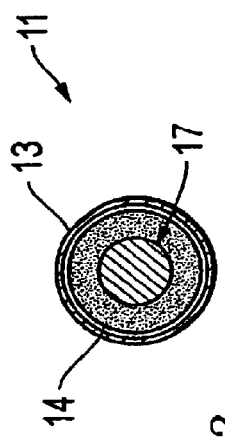
FIG. 1
FIG. 2

TESTING APPARATUS AND METHOD

BACKGROUND OF THE INVENTION

The present application claims the benefit of the filing date of Provisional Application Ser. No. 60/238,939, filed Oct. 10, 2000, now pending (hereby incorporated by referenced for all purposes).

The present invention relates generally to a testing apparatus and method, and more particularly, to such an apparatus and method for generating a detectable indicator gas used in a variety of testing procedures. The indicator gas generated by the inventive apparatus may be used, for example, to fit test respiratory protection devices; as an air flow indicator industry; or as a leak detection indicator for negative and positive pressure enclosures.

Prior art gas-sampling devices are provided with a manual pump to draw gas into a compartment containing a chemical substance. When the chemical and the gas are mixed, a reaction occurs which effects a coloration indicating the level, amounts, or constituents of the gas sample. Alternatively, prior art respirator fit testing devices have been used with a similar manual pump. The pump is manually operated to draw air into the container and to expose the chemical stored in the device, thereby generating a chemical reaction that produces a gaseous-vapor or smoke. The smoke generated is dispersed in the vicinity of the wearer of the respiratory protection device such that, if the respiratory protection device does not provide the necessary seal, the smoke is detected by the wearer.

Prior art respiratory fit testing devices employ an elongated, glass tube equipped with a hollow, middle compartment for containing the chemical substance and ends which may be broken to introduce ambient air into the container. The glass tube is attachable to a hand pump, such as a hand bulb or squeeze bulb, than is manually operated to force or draw air past the chemical substance, thereby generating a chemical reaction to produce "smoke."

SUMMARY OF THE INVENTION

One of multiple objects of the invention is to provide an improved apparatus and method for testing a condition in a local environment and/or the operability of equipment located in that environment. The inventive apparatus and method are particularly adapted for use in the fit testing of respiratory protection devices, as an air flow indicator (e.g., for testing heating, ventilating and air conditioning equipment ("HVAC")), or as a leak detection indicator for negative and positive enclosures. Accordingly, the following detailed description focuses on these types of testing devices and methods to illustrate the invention. It should be noted, however, that the various aspects of the invention may be adapted for use in other types of testing apparatuses and methods, as further explained below.

In accordance with the present invention, an apparatus is provided for testing equipment located in a local environment by presenting a detectable indicator gas therein. The apparatus has a container portion, a chemical substance stored in the container portion, a pump operable to draw air into the container portion and in contact with the chemical substance to generate a detectable indicator gas, and an outlet to the container for directing the indicator gas into the local environment. Further, the pump is integrally formed as one piece with the container portion. The pump could be a manually operable squeeze bulb, a bellows-driven pump, or a syringe. Preferably, the pump is joined (e.g., by molding) seamlessly with said container portion and is made of a polymeric or plastic material.

In alternative embodiments, the container portion is formed from a first material and the pump is formed from a second material distinct from the first material. As another example, the container portion and the pump are formed from a laminate of at least a first material layer and a second material layer distinct from the first material layer.

The selection of the chemical substance may vary with the specific application, but, typically, the chemical substance is reactive with air to generate the indicator gas. In one application, the chemical substance is selected such that the chemical substance and air drawn into the container portion generate a scented indicator gas upon contact. In another application, the chemical substance is reactive with air to produce an irritant gas. For example, the chemical substance may be liquid $SnCl_4$ used to generate (with the air) an indicator gas in the form of an acid vapor fume ("smoke"). In yet another application, the chemical substance is reactive with air to generate a visually detectable indicator gas.

The invention is further directed to a method of manufacturing an apparatus for testing equipment in a local environment by presenting a detectable indicator gas therein. The method includes the steps of providing a flexible material, preferably plastic, integrally forming, as one piece, a container portion and a squeeze bulb portion using the plastic material and storing a chemical substance in the container portion, such that upon operation of the bulb to draw air into the container portion, a detectable indicator gas is generated for presentation into the local environment.

In another aspect of the invention, a method of testing equipment in a local environment is provided. The testing method involves storing a chemical substance, reactive with air to produce an indicator gas, in a container formed substantially from a polymeric material and providing a polymeric squeeze bulb device in operative communication with the container and formed integrally, as one piece, therewith. A portion of the container tube is broken to provide an outlet, and them the squeeze bulb is operated to draw air past the chemical substance to produce a human detectable outward of the container and into the local environment. In the local environment, the indicator gas may be detected to determine the operability of the equipment in the local environment. For example, the indicator gas may be visually observable gas, such that a detecting step includes visually observing the behavior of the indicator gas in the local environment or observing the flow of the indicator gas in the local environment.

Other and further objects, features, and advantages of the present invention will be apparent from the following detailed description of a presently preferred embodiment(s) of the invention, given for the purpose of disclosure, and taken in conjunction with the accompanying drawing.

BRIEF DESCRIPTION OF THE DRAWINGS

FIG. 1 is a side-view of a testing apparatus with a partial longitudinal section cut away, according to the present invention; and FIG. 2 is a cross-sectional view of the testing apparatus in FIG. 1 taken along line AA.

DETAILED DESCRIPTION

The present invention relates generally to a testing apparatus and method. Typically, the inventive apparatus is operated to generate a gas or vapor and to place or present the gas or vapor in an environment wherein equipment is to be tested, thereby testing the operability of equipment provided therein. In particular, the present invention is applicable for use as a field-ready respirator fit testing device, field-ready air flow indicator, on a leak detection indicator for negative and positive enclosures. In each of these applications, the gas or vapor (hereinafter referred to as the "indicator gas") has a certain distinct property that is detectable by the human senses or equipment. More particularly, the indicator gas has a property that, when detected at a predetermined level or manner, is indicative of the local condition or equipment performance being tested. Typically, the detection of the indicator gas determines or confirms the operability or performance of equipment in the local environment (e.g., in the vicinity of the indicator gas).

Upon review of the detailed description and the drawings provided herein, it will become apparent to one of ordinary skill in the relevant instrumentation or testing art that various aspects of the invention are applicable to other equipment and methods and, more particularly, to other testing devices, instrumentations and methods. Accordingly, the present invention is not intended to be limited to the structures and the methods specifically described and illustrated herein.

Figure 3:
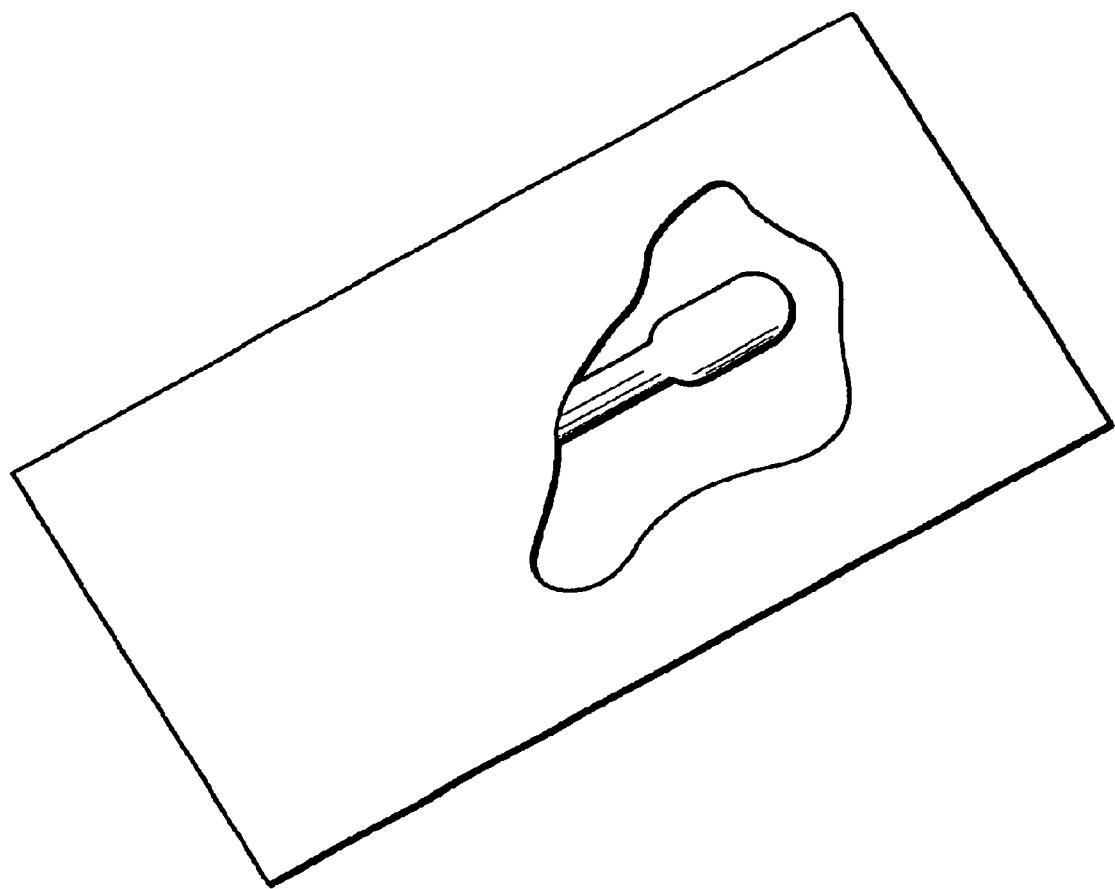
FIG. 3 is a plan view with cut-out of a testing apparatus in accordance with another embodiment of the present invention.
Figure 4:
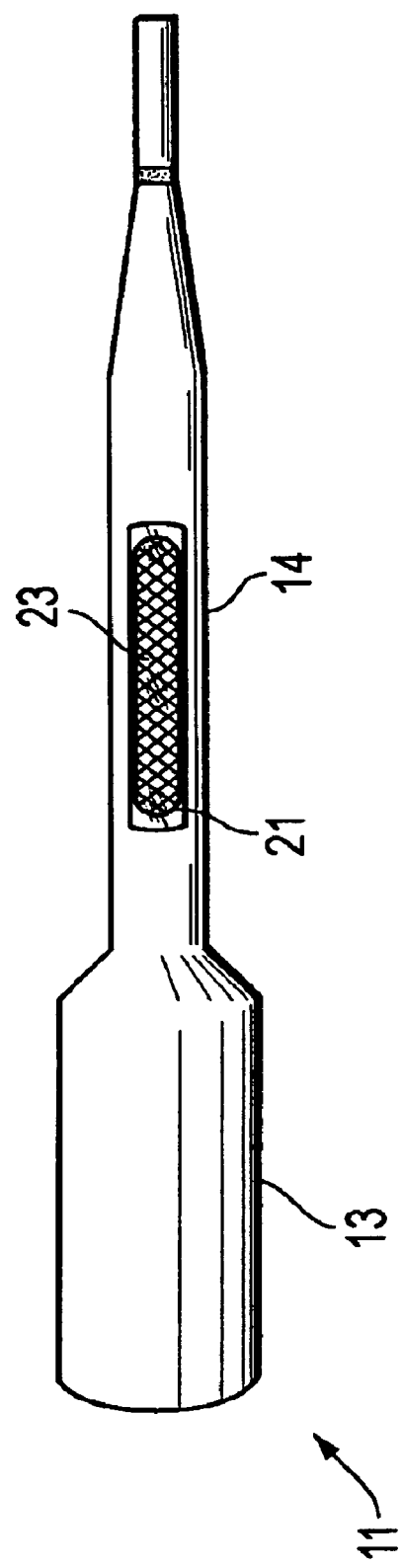
FIG. 4 is a side-view of an alternative testing apparatus having a breakable glass tube, according to the invention.

FIG. 1 and FIG. 2 depict a testing device embodying several aspects of the invention. In one aspect of the invention, the testing device 11 of FIG. 1 is a one-piece, molded structure having a shape similar to that of a dropping pipette. The device 11 is preferably constructed of a polymeric material such as a common plastic and, more preferably, a low density polyethylene (LDPE). In an alternative embodiment, the device 11 may be formed from a multi-layer laminate (e.g., an LDPE and mylar bag combination). The laminate coating could be applied to reduce porosity and/or increase resistance to mechanical or chemical challenges of the original material of the apparatus. As an example, the laminate could serve as a barrier to water and oxygen. In another alternative embodiment as shown in FIG. 3, the device 11 may be stored in an impermeable (e.g. mylar) bag to minimize air contact to the device 11 (until the testing operation). The exterior layer could be tightly sealed around the form of the device 11, or allow space for an inert gas or other material that would prevent degradation of any or all portions of the apparatus. In yet another alternative embodiment, the materials in the container tube 14 (i.e. the plugging material and the chemical substance 23) are encapsulated in a breakable glass tube 21 as shown in FIG. 4 (wherein like reference numerals are used to indicate like elements). Such use of multiple materials allows one layer to provide certain advantageous properties (e.g., low permeability, inertness, non-reactive with the chemical, non-corrosive, good sealing properties. etc.) while the other layer provides other advantageous properties (e.g., high strength, tear resistance, durability).

The device 11 includes an elongated container tube 14 and a manual pump 13 formed integrally as one-piece with the tube 14. The pump 13 could be a manually squeezable bulb, a bellows-driven pump, or a syringe. As shown in FIG. 1, the pump is a manually squeezable bulb 13. The tube 14 and 13 are preferably molded to form a continuous, seamless one-piece structure. One end of the tube 14 is a sealed tip 21 that may be cut or broken off prior to operation. The sealed tip 21 is sealed in a number of ways including by heat sealing or installment of a rubber cap. A middle portion 17 of the tube 14 container or otherwise stores a chemical substance. Advantageously, the bulb 13 is formed continuously with the tube 14 at the end of the tube 14 opposite the sealed tip 21. It should be noted, however, that pump 13, although formed continuously or integrally with the tube 14, (e.g., through molding), may be constructed of a material different form the tube portion 14.

It should be noted that the phrase "formed integrally as one piece" refers to a structure of two or more portions which are formed together from one or more material sources, such that the end product (as used in the testing operation) is a permanently joined single structure. As a result, the inventive device is easier to package, assemble (no assembly required), and to operate (no assembly required). Additionally, by using a polymeric material, the durability and effectiveness of the testing device are enhanced (among other things).

The embodiment illustrated in FIG. 1 is approximately 5" long. The bulb 13 is approximately 1½" long and is preferably about ⅝" in diameter. The tube 14 is preferably smaller in diameter (i.e., about ¼). As compared to prior art bulbs, the inventive bulb 13 is less rigid and more resilient. The minimum wait time between pumps is shorter and thus, the bulb may be squeezed more frequently than prior art rubber bulbs.

For a respirator fit testing device, the middle of the container portion 17 includes a first plug 15, preferably comprising cotton, and a second plug disposed on either end of a preferably granular mixture of silicate gel packing (small blades), and liquid SnCl4 (tin tetrachloride) (as the chemical substance) distributed over the packing surface. The primary function of the plugs 15,17 is to prevent movement of the packing and the chemical. The plugs should be made out of a material strong enough to retain the contents of the middle portion, but still be permeable to air. Because the tip end 21 is preferably heat sealed, moisture (i.e., water) is prevented from entering the device 11 and prematurely reacting with the $SnCl_4$.

With prior art respiratory fit testing devices, the sealed ends of the glass tubes are broken off and then a rubber bulb (e.g., 50 mL in volume) is attached to one end of the tube. In the inventive method, the sealed tip end 21 is cut or broken off and then the bulb 13 is operated to draw air through its inlet. Moisture in the drawn air passes through the packing, contacts the $SnCl_4$, and reacts with the $SnCl_4$. The chemical reaction creates an acid vapor fume of HCl (hydrochloric acid) or smoke that may then be dispersed around or in the vicinity of the respiratory protection device. The acid vapor fume is an irritant that may is detectable (e.g., upon contact with the nasal passages) by the wearer of the respiratory device.

Typically, the individual being "fit tested" is fitted with a respirator. The person administering the test then brings the tube 14 of the device 11 close to the individual being tested and squeezes the bulb 13 to create the indicator gas. The individual being "fit tested" then performs several maneuvers to test the seal of the respirator. If the respirator fails, the user will detect the indicator gas through physical properties (e.g. smell, irritating nature, or taste). Examples of types of substances that create the indicator gas for this application are stannic chloride, isomayl acetate, Bitrex™, and saccharin. If the seal does not leak, the individual will not be exposed to the indicator gas and will not detect any of the physical properties.

When the heat sealed tip end 21 is cut, the bulb 13 of the inventive device may be squeezed 20 times to attain a total smoke volume 200 mL, which is in accordance with the requirements of the (Occupational Safety and Health Administration (OSHA) standard (respiratory fit test standard final rule (29 C.F.R. 1910.134) published Jan. 8, 1998, for qualitative fit testing) hereby incorporated by reference. The inventive device 11 will typically be used by health and safety professionals at their facilities and in the field to ensure that the respirators assigned to employees are properly fitted.

Among the many advantages of the inventive device is that the device has a smaller bulb than prior art devices. The bulb is easier to squeeze, and the bulb allows for a more controlled volume delivery of irritant smoke, reducing the possibility of overexposing a test subject to irritant fumes. The inventive device is less fragile than prior art devices, reducing the risk of breakage and subsequent release of irritant fumes during shipment. Further, the inventive device is lighter than the glass tubes of the prior art, requires minimal preparation to use (i.e., does not require glass ends to be broken and a pump to be attached), and is generally more convenient to use in the field. For example, the bulb or alternative pumping device cannot be lost, contaminated or misplaced. There are no sharp pieces of glass (created by breaking the tips of prior art glass tubes) generated during operation that could be a potential source of injury.

In another application of the invention, the invention is used in the HVAC industry to determine visually or olfactorally whether HVAC equipment is functioning correctly. For instance, the indicator gas produced by the inventive device may be a visible fume or smoke used to visually indicate the directional motion of air currents to verify that ventilation hoods used in laboratories are functioning correctly (i.e., that the air is being drawn up through the hood). An example of a substance that would produce this indicator gas is stannic chloride. Alternatively, the indicator gas could be scented. Also, smoke produced by the inventive apparatus may be blown through a ventilation shaft to indicate whether air is being drawn in properly through the shaft and also if air comes out of the shaft properly.

In some applications, air drawn, and then expelled, through the tube "reacts" with the chemical substance by picking up or carrying molecules of the chemical substance. For example, air drawn past a chemical substance in the form of banana oil picks up or carries molecules of the banana oil. Thus, the resultant mixture (air and banana oil molecules) is, therefore, characterized by a distinct scent. In one respect, the drawn air acts as a carrier for the chemical substance.

Additionally, the invention could be used to visually determine if the integrity of a positive or negative pressure container has been compromised. OSHA includes device use approval for glove bag, glove box, and negative pressure enclosure standard 29 CFR 1926.1101(g)(5).

The foregoing description of the present invention has been presented for purposes of illustration and description. It is to be noted that the description is not intended to limit the invention to the apparatus and process disclosed herein. Various aspects of the invention as described above may be applicable to other types of testing apparatuses and instrumentation, and testing or sampling processes. For example, the feature of a container tube integrally formed with a hand pump or bulb device may be implemented in other types of testing instruments other than smoke-generating testing devices. These variations of the invention will become apparent to one skilled in the art provided with the present disclosure. Consequently, variations and modifications commensurate with the above teachings, in the skill and knowledge of the relevant art, are within the scope of the present invention. The embodiments described and illustrated herein are further intended to explain the best modes for practicing the invention, and to enable others skilled in the art to utilize the invention in other embodiments and with various modifications required by the particular applications or uses of the present invention.

What is claimed is:

1. An apparatus for testing equipment located in a local environment by presenting a detectable indicator gas therein, said apparatus comprising:
    a one-piece, polymeric pump and container portion combination;
    a chemical substance stored in said container portion, said substance being reactive with air from the local environment;
    a glass enclosure resting within said container portion and surrounding said chemical substance;
    wherein said pump is operable to draw air into said container portion and in contact with said chemical substance to generate a detectable indicator gas, wherein said pump and said container portion are positioned in fluid communication and define a substantially fluid impermeable internal environment that includes said chemical substance and is sealed from the local environment; and
    an outlet to said container that is severable to direct said indicator gas into the local environment.

2. The testing apparatus of claim 1, wherein said pump is integrally formed as one piece with said container portion.

3. The testing apparatus of claim 2, wherein said pump is selected from the group of manually operable pumps consisting of: a manually squeezable bulb, a bellows-driven pump, a syringe, and combinations thereof.

4. The apparatus of claim 1, wherein said chemical substance is reactive with air to generate irritant smoke.

5. The testing apparatus of claim 2, wherein said container portion and said pump are formed from a plastic material.

6. The testing apparatus of claim 5, wherein said plastic material is low density polyethylene.

7. The testing apparatus of claim 2, wherein said container portion is formed from a first material and said pump is formed from a second material distinct from said first material.

8. The apparatus of claim 1, wherein said pump and said container portion are joined seamlessly.

9. The testing apparatus of claim 2, wherein said container portion and said pump form a substantially permanent molded structure.

10. The testing apparatus of claim 1, wherein said chemical substance is reactive with the container environment, upon operation of the pump, to generate said indicator gas.

11. The testing apparatus of claim 1, wherein said chemical substance is selected such that said chemical substance and air drawn into said container portion generate a scented indicator gas upon contact.

12. The testing apparatus of claim 1, wherein said chemical substance is reactive with air to produce an irritant gas.

13. The testing apparatus of claim 12, wherein said chemical substance is liquid $SnCl_4$ and said indicator gas is an acid vapor fume.

14. The testing apparatus of claim 1, wherein said chemical substance is reactive with the container environment, upon operation of the pump, to generate a visually detectable indicator gas.

15. The testing apparatus of claim 1, wherein said pump has a hole to allow finger release of pressure.

16. The testing apparatus of claim 1, further comprising an exterior layer of laminate that seals the container.

17. A method of fit testing respiratory protection equipment in a local environment by presenting a detectable indicator gas therein, said method comprising the steps of:
storing a chemical substance, reactive with air to produce an indicator gas in the form of irritant smoke, in a container formed substantially from a polymeric material;
providing a polymeric squeeze bulb device in operative communication with the container, and formed integrally, as one piece therewith, such that the squeeze bulb device and the container are in fluid communication and define a substantially fluid impermeable internal environment that is sealed from the local environment;
breaking a portion of the container to provide an outlet;
operating the squeeze bulb to draw air past the chemical substance to produce a human detectable indicator gas in the form of irritant smoke;
directing the indicator gas outward of the container and into the local environment; and
detecting the indicator to determine the operability of the equipment in the local environment; and
wherein said step of providing a polymeric squeeze bulb includes ensuring that said step of operating the squeeze bulb does not generate a smoke volume exceeding a predetermined volume by selecting a polymeric squeeze bulb having a maximum pumping capacity that is below the predetermined volume whereby the selected squeeze bulb is affixed to the container.

18. The method of claim 17, wherein the chemical substance is liquid $SnCl_4$ or $H_2SO_4$ and said step of operating the squeeze bulb generates a chemical reaction producing an irritant indicator gas.

19. The method of claim 17, wherein the indicator gas is indicator gas having a pre-selected scent, said observing step including detecting the scent of the indicator gas to determine the operability of the equipment.

20. The method of claim 17, wherein said storing step includes storing the chemical substance within a substantially fluid impermeable enclosure.

21. The method of claim 20, wherein said storing step includes storing the chemical substance in a breakable glass enclosure disposed within the container.

22. The method of claim 20, further comprising the step of storing the polymeric squeezable bulb device and container in a substantially fluid impermeable bag prior to said breaking and operating steps.

23. A method of testing respiratory protection equipment in a local environment by presenting a detectable indicator gas therein, said method comprising the steps of:
storing a chemical substance, reactive with air to produce an indicator gas in a container formed substantially from a polymeric material, including storing the chemical substance in a breakable glass enclosure disposed Within the container;
providing a polymeric squeeze bulb device in operative communication with the container, such that the squeeze bulb device and the container are in fluid communication and define a substantially fluid impermeable internal environment that is sealed from the local environment;
breaking a portion of the container to provide an outlet;
operating the squeeze bulb to draw air past the chemical substance to produce a human detectable indicator gas;
directing the indicator gas outward of the container and into the local environment; and
detecting the indicator to determine the operability of the equipment in the local environment.

24. The method of claim 23, wherein said providing step includes providing a squeeze bulb integrally formed as one piece with the container.

25. The method of claim 23, wherein the indicator gas is a visually observable gas, said detecting step including visually observing the behavior of the indicator gas in the local environment.

26. The method of claim 23, wherein the equipment is respiratory protection equipment, and wherein said step of operating the squeeze bulb generates a chemical reaction producing an irritant indicator gas and said step of detecting the indicator determines the fit of the respiratory protection equipment.

27. A method of fit testing respiratory protection equipment in a local environment by presenting a detectable indicator gas therein, said method comprising the steps of:
storing a chemical substance, reactive with air to produce an indicator gas in the form of irritant smoke, in a container formed substantially from a polymeric material;
providing a polymeric squeeze bulb device in operative communication with the container, and formed integrally, as one piece therewith, such that the squeeze bulb device and the container are in fluid communication storing the polymeric squeeze bulb device and the container in a substantially fluid impermeable bag such that the chemical substance is stored in a substantially fluid impermeable environment;
breaking a portion of the container to provide an outlet;
operating the squeeze bulb to draw air past the chemical substance to produce a human detectable indicator gas in the form of irritant smoke;
directing the indicator gas outward of the container and into the local environment; and
detecting the indicator to determine the operability of the equipment in the local environment.

28. The method of claim 27, wherein the chemical substance is liquid $SnCl_4$ or $H_2SO_4$ and said step of operating the squeeze bulb generates a chemical reaction producing an irritant indicator gas.

29. The method of claims 27, wherein said steps of providing a polymeric squeeze bulb includes ensuring that said step of operating the squeeze bulb does not generate a smoke volume exceeding a predetermined volume by selecting a polymeric squeeze bulb having a maximum pumping capacity that is below the predetermined volume whereby the selected squeeze bulb is affixed to the container.

30. An apparatus for testing equipment located in a local environment by presenting a detectable indicator gas therein, said apparatus comprising:
a one-piece, polymeric pump and container portion combination;
a chemical substance stored in said container portion, said chemical substance being reactive with air from the local environment;
wherein said pump is operable to draw air into said container portion and in contact with said chemical substance to generate a detectable indicator gas, wherein said pump is integrally formed as one piece with said container portion such that said pump and said container portion are in fluid communication;

an outlet to said container that is severable to direct said indicator gas into the local environment; and a substantially fluid impermeable bag surrounding said polymeric pump and container portion combination, such that said chemical substance is stored in a substantially fluid impermeable internal environment that is sealed form the local environment.

31. The testing apparatus of claim 30, wherein said pump is a manually squeezable bulb.

32. The testing apparatus of claim 30, wherein said chemical substance is reactive with air to produce an irritant gas.

33. The testing apparatus of claim 30, wherein said container portion and said pump are formed from a plastic material.

34. The testing apparatus of claim 30, wherein said container portion is formed from a first material and said pump is formed from a second material distinct from said first material.

35. A method of manufacturing an apparatus for testing equipment in a local environment by presenting a detectable indicator gas therein, said method comprising the steps of:

selecting a squeeze bulb portion and a container portion;

storing a chemical substance in the container portion that is reactive with air to generate, a detectable indicator gas for presentation into the local environment;

integrally forming, as one piece, the container portion and the squeeze bulb portion, whereby die container portion and the pump are in fluid communication and define a substantially fluid impermeable internal environment that includes the chemical substance and is sealed from the local environment; and wherein said selecting step includes selecting a squeeze bulb portion having a pumping capacity that is below a predetermined capacity, whereby said integrally forming step forms a one-piece squeeze bulb and container portion apparatus having a maximum pumping capacity below the predetermined capacity.

36. The method of claim 35, further comprising the steps of:

providing a flexible material; and providing a second material;

wherein said integrally forming step includes using the flexible material and applying the second material adjacent the flexible material to form a laminate therewith, wherein the laminate is substantially more fluid impermeable than the flexible material.

37. The method of claim 36, wherein said step of providing a flexible material includes providing a plastic material.

38. The method of claim 36, wherein said step of providing a second material includes providing a mylar material.

39. The method of claim 35, further comprising the step of sealing a breakable end tip of the container tube portion located opposite the squeeze bulb.

40. The method of claim 35, wherein said storing step includes storing a chemical substance that, when contacted by air drawn into the container portion, generates an irritant smoke.

41. The method of claim 35, wherein said storing step includes storing the chemical substance within a substantially fluid impermeable enclosure.

42. The method of claim 35, wherein said storing step includes storing the chemical substance in a breakable glass enclosure disposed within the container portion.

* * * * *